Patented May 8, 1945

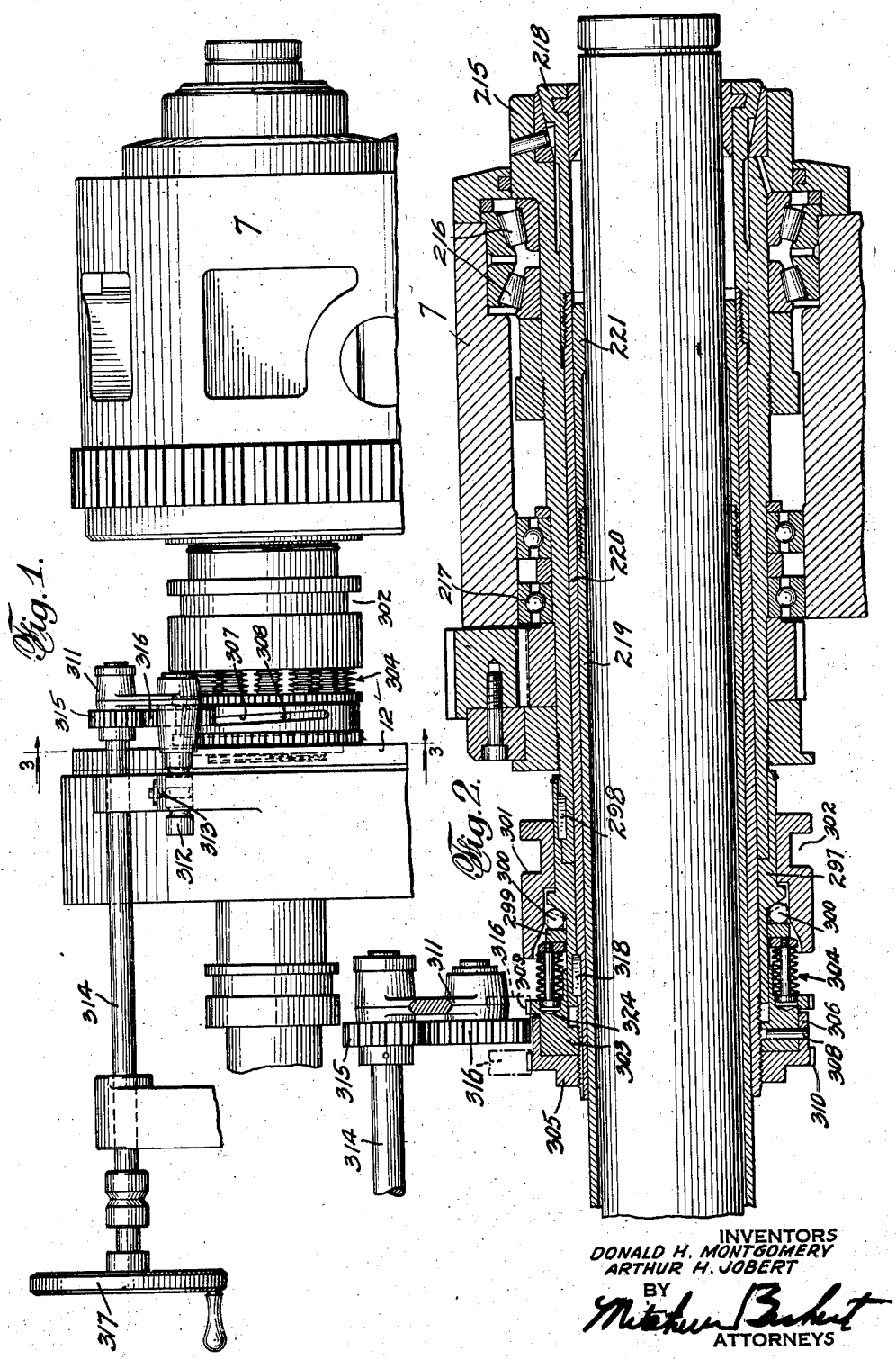

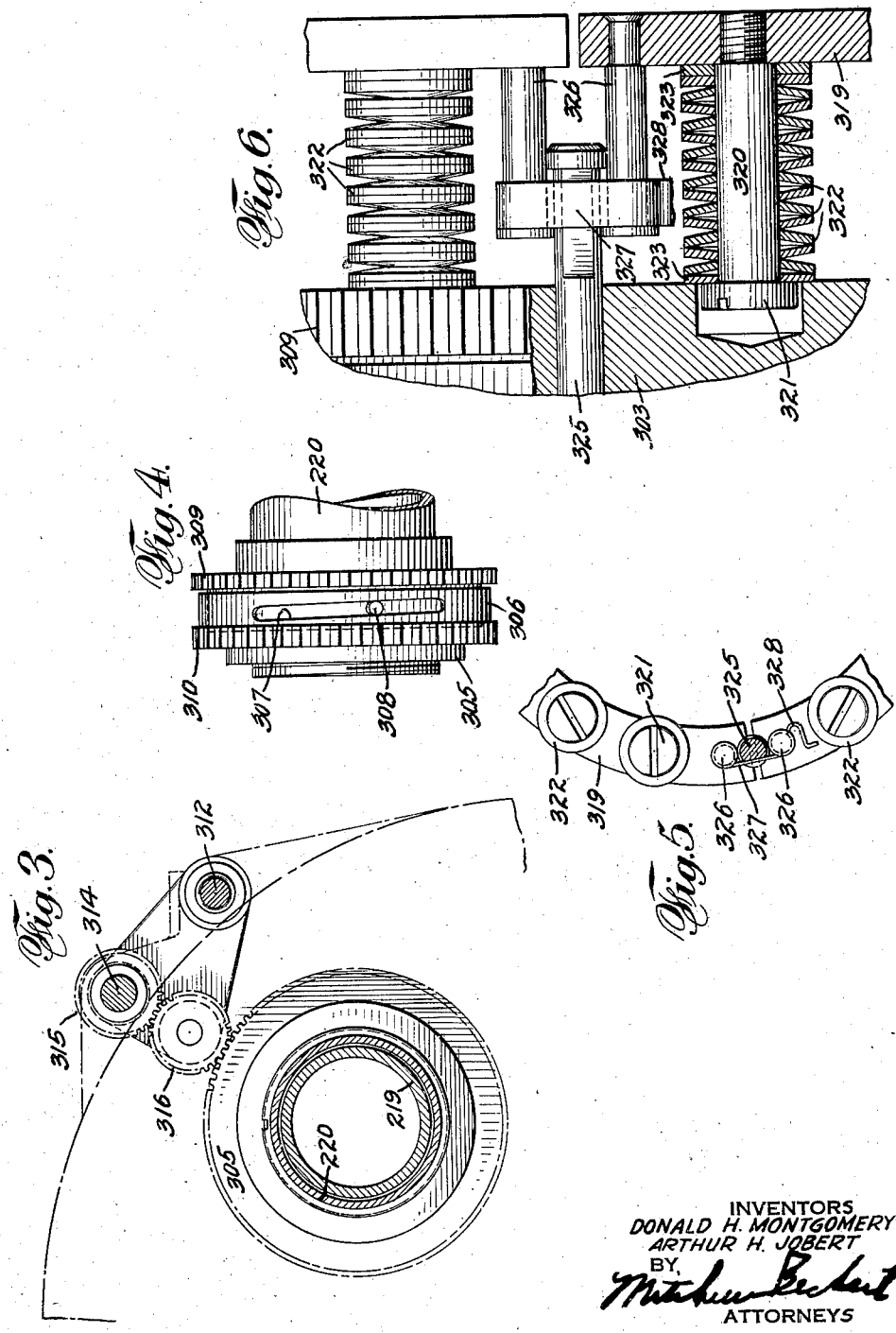

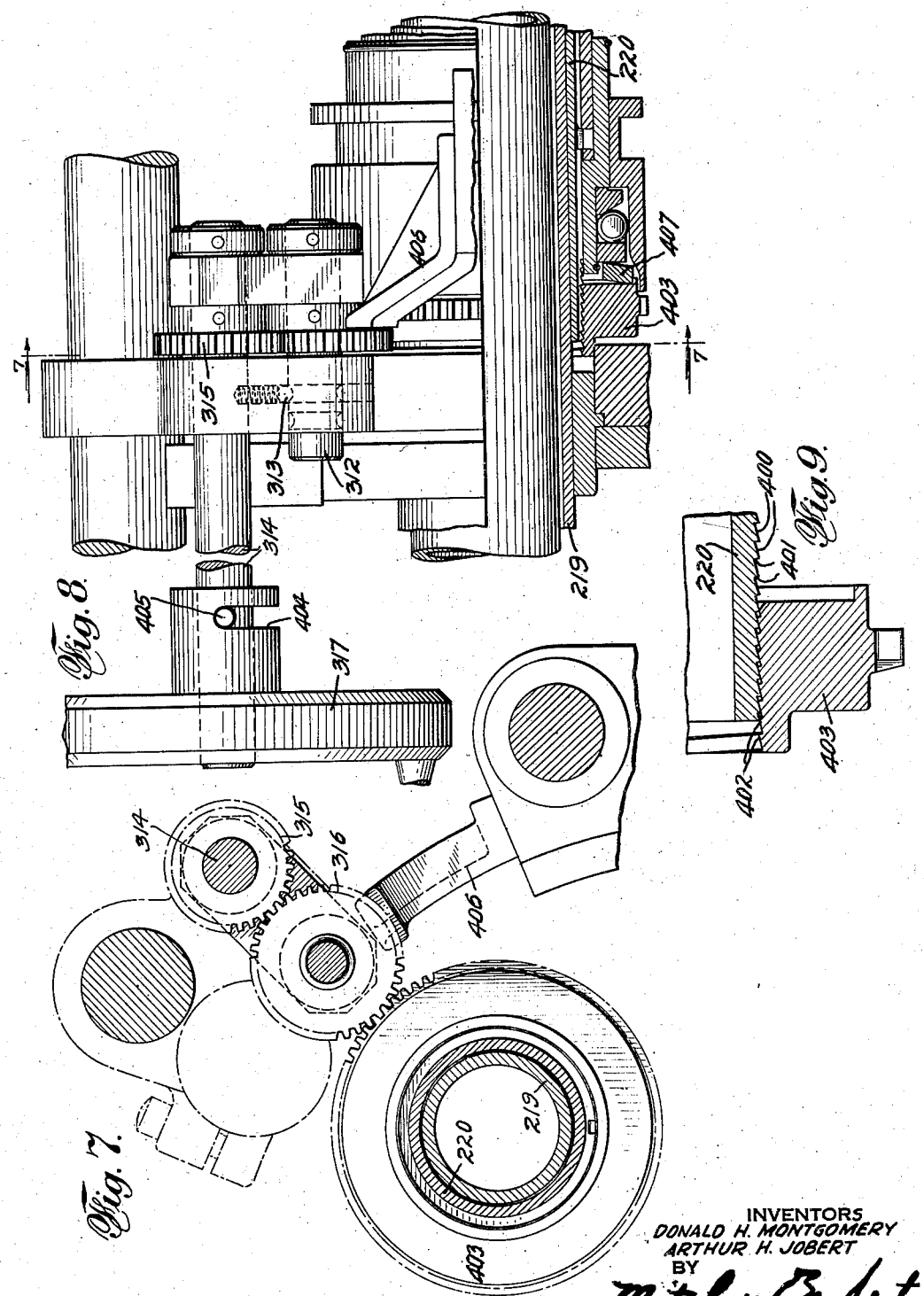

2,375,734

UNITED STATES PATENT OFFICE 2,375,734

MACHINE TOOL

Donald H. Montgomery, West Hartford, and Arthur H. Jobert, New Britain, Conn., assignors to The New Britain Machine Company, New Britain, Conn., a corporation of Connecticut Application March 4, 1940, Serial No. 322,124

3 Claims. (Cl. 279—1)

Our invention relates to a machine tool, and this application is a continuation in part of our application, Serial No. 138,282, filed April 22, 1937, now Patent No. 2,192,198, granted March 5, 1940.

It is the general object of our invention to provide various improved features connected with or related to the chucking means for bar stock or work pieces.

A more specific object is to provide improved collet or chuck adjusting means and which is readily accessible for quick adjustment.

Another object is to provide chuck or collet adjusting means, together with means for automatically preventing accidental or intentional spindle actuation during adjustment.

Another object is to provide compensating mechanism for a collet or chuck, which will permit satisfactory chucking of work pieces of substantially different sizes and which may be readily applied and removed without substantial dismantling operations.

Another object is to provide improved means for very readily removing a collet or chucking means from a spindle.

Other objects and various features of novelty and invention will be hereinafter pointed out or will become apparent upon a study of the illustrated disclosure of the invention.

In the drawings which show, for illustrative purposes only, preferred forms of the invention—

Fig. 1 is a fragmentary view of a spindle carrier, together with collet adjusting and compensating means, illustrative of the invention;

Fig. 2 is an enlarged fragmentary, central sectional view through a spindle and associated parts;

Fig. 3 is a fragmentary sectional view taken substantially in the plane of the line 3—3 of Fig. 1;

Fig. 4 is an enlarged fragmentary view of the collet adjusting and locking mechanism;

Fig. 5 is a fragmentary end view in elevation of collet compensating mechanism;

Fig. 6 is an enlarged, partly sectional view of the compensating mechanism shown in Fig. 5 and other associated parts;

Fig. 7 is a fragmentary sectional view taken substantially in the plane of the line 7—7 of Fig. 8 and illustrating the collet adjusting mechanism;

Fig. 8 is a fragmentary side view in partial section of one spindle and collet adjusting means of a slightly modified form;

Fig. 9 is a fragmentary, enlarged sectional view illustrating the modified collet adjusting means of Fig. 8.

The machine in general will be referred to but briefly herein, a reference being made to our aforesaid application for a fuller disclosure of the machine in general and its operation.

The spindle carrier 7 carries a plurality of spindles 215, for example in bearings 216—217. Collets 218 of conventional or desired form are provided for each spindle. The stock feed tube 219 having feed fingers 221 for feeding the bar of stock is actuated in any usual manner forming no part of the present invention. The collet is secured to the collet tube 220 so that when the latter is drawn rearwardly the stock is chucked up and when moved forwardly the stock is released in the usual manner.

While the chucking means may take various forms, we have disclosed a collet actuator broadly like that disclosed in Montgomery patent, No. 2,153,971, April 11, 1939. There is a sleeve 297 (Fig. 2) keyed at 298 to the spindle 215. The sleeve carries an abutment ring 299, and wedge members in the form of balls or rollers 300 are interposed between relatively inclined abutment surfaces on the ring 299 and the sleeve 297. The sleeve 297 slidably carries a chucking sleeve 301 having a bell mouth to cam the balls or rollers 300 inwardly for forcing the abutment 299 rearwardly for drawing the collet tube rearwardly and chucking up the bar stock. The chucking sleeve 301 has the usual spool or circumferential groove 302 for the reception of a chucking fork, as will be understood.

Between the abutment 299 and a second abutment member or nut 303 on the collet tube 220 is interposed an improved compensating mechanism designated generally 304 to provide compensation for bar stock varying somewhat in size. The abutment nut 303 is screw threaded to the end of the collet tube and a lock nut 305 is also screw threaded on the collet tube and serves to lock up the abutment 303. As shown in the drawings, the nut 305 has a flange 306 overstanding a part of the abutment nut 303. The sleeve 306 is provided with a slot 307 following the pitch of the thread on the collet tube and the abutment nut 303 carries a pin 308 fitting within the slot 307 for a purpose which will be described.

Each of the nuts 303—305 are provided peripherally with gear teeth 309—310 for the purpose of rotating the nuts by gear means which may be actuated from a conveniently located accessible remote point for collet adjustment or removal and replacement. As shown more particularly in Figs. 1, 2, and 3, there is a bracket 311 carried by a shaft 314 rotatably mounted in the thrust housing at the rear of the spindle carrier. A pin 312 having three spaced apart grooves to be engaged by a spring pressed pin or plunger 313 for holding the bracket in one of the two positions corresponding to the grooves serves to support the bracket 311. The bracket 311 has a bearing for the shaft 314 mounted in the thrust bracket and the shaft also acts as a support. The shaft 314 carries a pinion 315 meshing with a gear 316 carried on a stub shaft on the bracket 311. The gear 316 during normal operation of the machine is positioned between the gears 309—310, as shown more particularly in Fig. 2. The shaft 314 extends rearwardly and is provided with a manual crank or handle 317 located in a conveniently accessible position.

When the handle 317 is drawn rearwardly, the gear 316 meshes with the gear 310 on the lock nut 305. Rotation of the handle 317 in proper direction will cause the lock nut 305 to be unscrewed so as to unlock the nut 303 and sufficient rotation of the handle 317 will cause the pin 308 in the abutment nut 303 to engage one end of the slot 307 (Fig. 4) and further rotation of the handle 317 will then cause the lock nut to be unscrewed and the pin 308 will drag the abutment nut 303 with it for unscrewing the same. When the nut 303 has reached the desired position, the handle 317 may be rotated in the opposite direction to turn the lock nut 305 relatively to the abutment nut 303 and cause the lock nut to again lock up the abutment nut 303. When it is desired to move the abutment nut 303 in the opposite direction the lock nut 305 is first loosened, as heretofore described, and the handle 317 then shifted to cause the gear 316 to mesh with the gear 309 on the abutment nut 303 which may then be rotated by rotation of the handle 317 and during such rotation the lock nut 310 will be dragged along by means of the pin 308 engaging the slot 307. When the abutment nut 303 is in the desired position of adjustment, the handle 317 is again shifted to cause engagement between the gears 316, 310 and the lock nut rotated to lock up the abutment nut 303. It will be seen that when it is desired to remove the collet completely, the handle 317 may be shifted to unlock the lock nut 305 and continued rotation will unscrew both of the nuts 303—305 from the collet tube simultaneously and if the nut 305 engages the thrust plate 12, the collet will be forced out forwardly and when completely unscrewed from the nuts, the collet tube may be drawn out through the forward end of the spindle. When a new collet is inserted, the handle 317 may be shifted to engage the gear 316 with the gear 309 and the new collet screwed into the nuts. The slot 307 and pin 308 will always serve to hold the two nuts 303—305 in position so as to provide a continuous thread for initial engagement with the threaded end of the collet tube. It should be here stated that the collet tube is provided with a keyway for engagement with a key 318 carried by the sleeve 297.

The improved compensating mechanism (Figs. 2, 5, 6), designated generally 304 and interposed between the abutment collar 299 and the abutment nut 303, preferably comprises a two-part annular ring 319 carrying a plurality of headed pins 320 secured thereto. Between the head 321 of each pin and the ring 319 are interposed a plurality of cupped spring washers 322 and end abutment washers 323. These spring washers when in place are under an initial tension, that is to say, they are preloaded. The abutment nut 303 is provided with bores 324 for the reception of the heads 321 of the pins 320 and such recesses or bores are deep enough to permit sufficient inward movements of the heads for further compression of the compensating washers 322 occasioned by collet adjustment. The abutment nut 303 may carry locating and guiding pins 325 engaging between the two halves of the two-part ring 319, as shown particularly in Figs. 5 and 6. Each half of the ring 319 adjacent each parting line carries a pin 326. One of the pins carries a spring latch 327 while the opposite end of the latch engages over the pin on the other section of the ring 319. A tang 328 extends from each latch to such an extent that a screw driver or similar instrument may be inserted between the tang and the compensating washers for releasing the latch 327 and permitting separation of the two ring halves. If for any reason the compensator should become damaged or if a compensator having different characteristics is required, the nuts 303—305 may be backed off, the chucking sleeve 301 moved to the right as viewed in Fig. 2, and the two halves of the compensating ring 319 separated and removed from the spindle laterally; that is to say, the entire spindle assembly need not be dismantled for the purpose of changing compensators, and yet compensators may be very readily removed and replaced and when in place will be securely held not only by the spring latch clamps 327 but by the pins 325 and the engagement of the heads 321 of the pins in the recesses or bores 324 of the abutment nut 303.

In that form of the invention shown in Figs. 7, 8 and 9, the general machine parts are the same as those heretofore described and have been given the same reference characters. However, in the form shown in these latter figures, instead of having a lock nut for the chucking abutment, we have provided improved means to avoid the use of such lock nut. As illustrated, the chucking tube 220 is provided with threads of peculiar form. The thread has one side 400 extending at a relatively small angle to the axis of the spindle. Such angle may vary somewhat but is preferably of the order of 12°. The opposite side 401 of the thread extends at a relatively sharp angle to the axis of the spindle and in the preferred form extends at about right angles to the thread face 400. When the chucking tube 220 is so arranged as to be drawn toward the left in Fig. 9, the threads taper outwardly and rearwardly as shown. However, should the chucking tube be arranged to chuck up when moved in the opposite direction, that is, toward the right, the threads would be reversed. The interengaging threads 402 on the chucking abutment 403 correspond in form to the threads on the chucking tube and the fit of the threads between the chucking tube and chucking abutment is preferably a relatively loose one so that when the chucking abutment 403 is drawn toward the left, the inclined faces of the threads ride up on each other with a very tight frictional grip. The relatively low angle of inclination of the threads is such that the tight binding of the chucking abutment and chucking tube will not be disturbed during all ordinary chucking and unchucking operations. When it becomes necessary to loosen the grip of the chucking abutment 403 on the chucking tube 220, as when adjusting the chucking abutment on the tube, or when it is desired to remove the chucking tube completely, it is necessary to forcibly rotate the abutment 403 and preferably to break the grip by means of a sudden jar. With that end in view, the shaft 314 and the relatively heavy fly wheel type handle or manual member may be coupled together by means of a lost motion connection; for example, the hub of the fly wheel handle 317 may be provided with a slot 404 and a pin 405 may be secured to the shaft. It will be understood, of course, that in this case the hub is rotatable on the shaft 314 so that when it is desired to break the tight grip of the chucking abutment on the chucking tube, the handle is quickly rotated and when the pin 405 is engaged by the end of the slot in the wheel hub, a very substantial jar is imparted to the chucking abutment, the grip is broken, and the relatively loose fit between the threads then permits very easy rotation of the chucking abutment so that it may be readily adjusted or may be rotated to a degree sufficient to force the chucking tube and collet outwardly of the spindle. When the chucking tube has been removed from the spindle it will be seen that the chucking abutment of Fig. 9, as well as the chucking abutment and lock nut of the first form of the invention, will be concentrically supported by machine parts so as to be in a position to again receive the chucking tube when put into place. In order to prevent accidental engagement of the adjusting means when the chucking means is moved to the chuck closed position, we may provide a safety abutment 406 which may be carried by the chucking slide so that when the latter is moved toward the left (Fig. 8) in moving the chucking means of the chuck to closed position, the safety abutment 406 will engage one of the actuating gears and hold it in its inoperative position as shown in Fig. 8.

Instead of the compensating mechanism of the first form of the invention, the resilient means of the chucking mechanism may comprise a disk-like spring washer 407 as shown.

While the invention has been described in considerable detail and preferred forms shown, it is to be understood that various changes may be made within the scope of the invention as defined in the appended claims.

We claim:

1. In a machine of the character indicated, a spindle, a chucking member therein, chucking means including opposed abutments on said spindle and chucking member, resilient compensating means between said abutments, said resilient compensating means including a pair of ring-like members surrounding said spindle, and means for detachably securing said ring-like members together, whereby the latter may be detached from each other and removed from said spindle in a lateral direction.

2. In a machine of the character indicated, a frame, a rotatable spindle supported therefrom, a collet tube in said spindle, chucking abutment means threaded to said collet tube, said chucking abutment means including an abutment member and a lock nut member, each of said members having gear means associated therewith and spaced apart longitudinally of said collet tube, an actuating gear movable into coacting engagement with the gears of said abutment and said lock nut, and an actuating shaft and handle for said actuating gear located at a point remote from said chucking abutment means, for the purpose described.

3. In a machine of the character indicated, a frame, a spindle carried thereby, a chuck actuator in said spindle, means for actuating said chuck actuator, including a chucking abutment and a lock nut therefor, said abutment and lock nut being screwthreaded to one of said members, and means for coupling said chucking abutment and lock nut to each other so as to permit only limited relative rotation between said chucking abutment and lock nut, for the purpose set forth.

DONALD H. MONTGOMERY.
ARTHUR H. JOBERT.